Dec. 8, 1931.      R. W. JOHNSON      1,835,307
REGULATING SYSTEM FOR HEATERS
Filed April 19, 1929      3 Sheets-Sheet 1

Roy W. Johnson, Inventor

By Bottum, Hudnall, Lecher, McNamara and Michael
Attorney

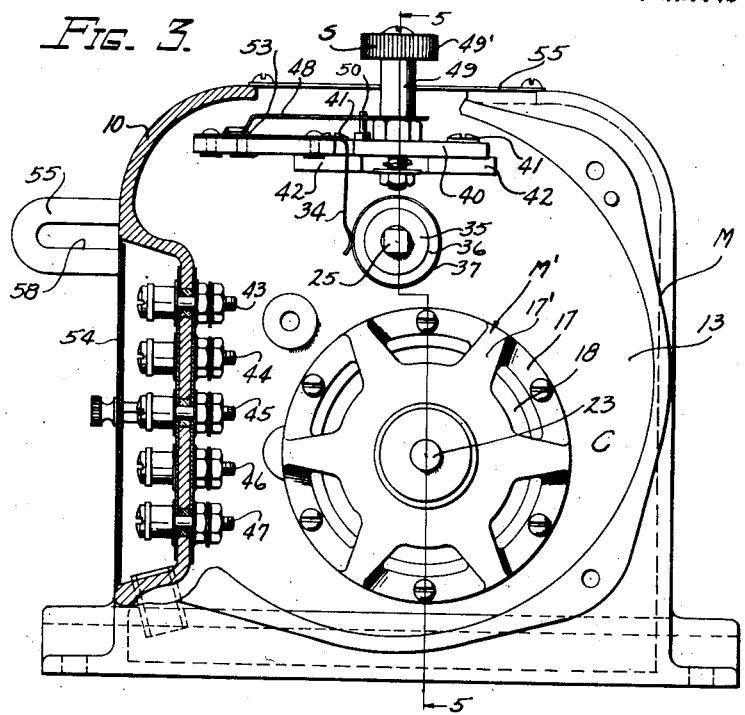
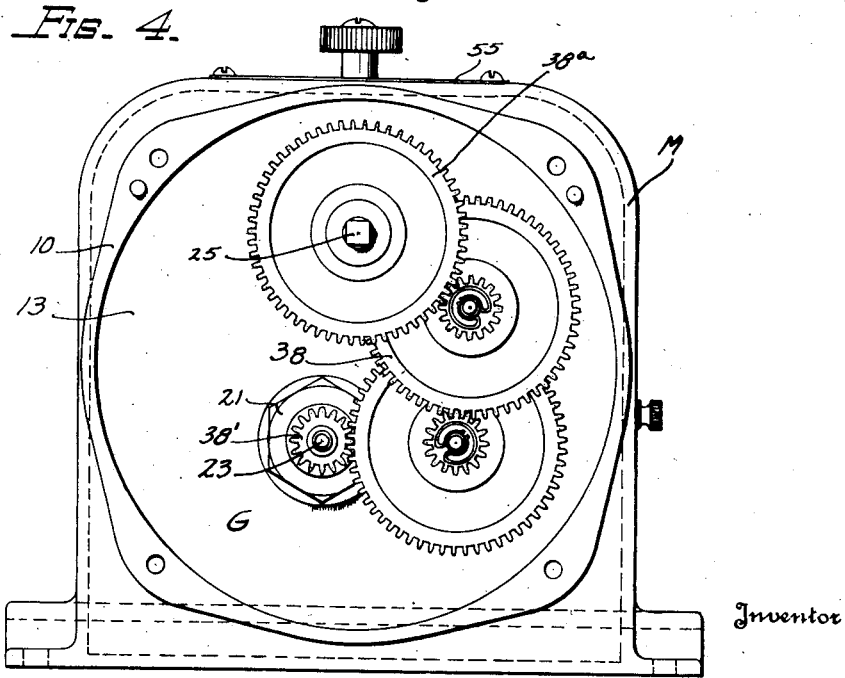

Dec. 8, 1931. R. W. JOHNSON 1,835,307
REGULATING SYSTEM FOR HEATERS
Filed April 19, 1929 3 Sheets-Sheet 3

Inventor
Roy W. Johnson

Patented Dec. 8, 1931

1,835,307

UNITED STATES PATENT OFFICE

ROY W. JOHNSON, OF MILWAUKEE, WISCONSIN, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

REGULATING SYSTEM FOR HEATERS

Application filed April 19, 1929. Serial No. 356,579.

This invention relates to regulating systems for heaters and more particularly to electrical systems for regulating the combustion of fuel in the boiler or furnace of a house heating system in response to conditions resulting from the combustion.

Various types of electrical control systems have been devised for regulating the dampers of a boiler or furnace in a house heating system and in which thermostatic means, operable in accordance with temperature conditions in a room, is employed for causing other elements of the system to open or close the dampers. Control systems of this nature, as heretofore constituted, failed to check the combustion in a heater after the same has generated the amount of heat effective to raise the room temperature to the desired point. Under normal conditions this is due to the fact that there is a lag between the rise in temperature produced in the heating medium, for example hot water, and the rise in room temperature effected by the radiators of the system. Consequently even after the room thermostat has shut off the heating plant, the room temperature continues to rise. Again, this may be due to a faulty condition such as a break or short circuit in the lead wires to the room thermostat, or may be due to the neglect or failure of the person operating the system to give the same proper attention. For example, it may happen that one or more radiators of a hot water, steam or vapor heating system, or one or more registers of a hot air system in the room in which the thermostat is located, are turned off with the result that the room is cold and a thermostat is calling for heat after a hot fire has been produced in the heater.

Under other circumstances the means for conducting heat from the furnace to the room may be sluggish and consequently the operation of the room thermostat is retarded to the extent that an excessively hot fire is built up before the thermostat has operated to check the same. Under these conditions the heating system is not only wasteful in fuel consumption but often builds up a dangerously high temperature.

An object of the invention is to obviate these difficulties and disadvantages and provide additional safety and economy by controlling the operation of the boiler or furnace in response to the temperature or pressure of the heating medium at the boiler or furnace as well as by the room temperature. In this way the boiler or furnace is prevented from building up the temperature of the heating medium beyond a safe or efficient point because to accelerate combustion in the heating plant not only must the room temperature be at or below the point that calls for heat but the temperature or pressure of the heating medium at the boiler or furnace must be below the maximum point at which the heating medium can operate efficiently and safely in the system.

A further object of the invention is to provide a control system of this character in which the controls are made very simple and sturdy and will give life-time service without attention.

A further object is to provide manually operable switching means for by-passing the room thermostat and the thermostat responsive to conditions in the boiler or furnace so that the draft control elements thereof may be operated independently of the conditions influencing the thermostat or control unit.

Another object is to provide an improved operating unit including an electric motor operable at low voltage, so as to eliminate conduit and reduce the cost of installation and maintenance. Organized with the motor in a simple and compact manner is the gearing and operating mechanism for controlling the draft regulating elements of the boiler or furnace and also a novel form of limit switch for automatically stopping the operation of the motor at the end of any operating cycle that is at the end of an opening or at the end of a closing movement of the draft regulating elements. The operating unit also contains the manually operable switch previously referred to.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 3 is a view in side elevation of the motor unit of Figure 1 with a side cover plate removed and with part of the casing cut away to show the construction of the parts;

Figure 4 is a view in side elevation of the opposite side of the motor unit from that of Figure 3, the adjacent cover plate being removed for the sake of illustration;

Figures 7, 8:
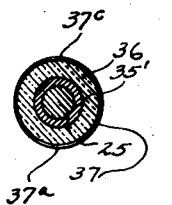
Figure 5:
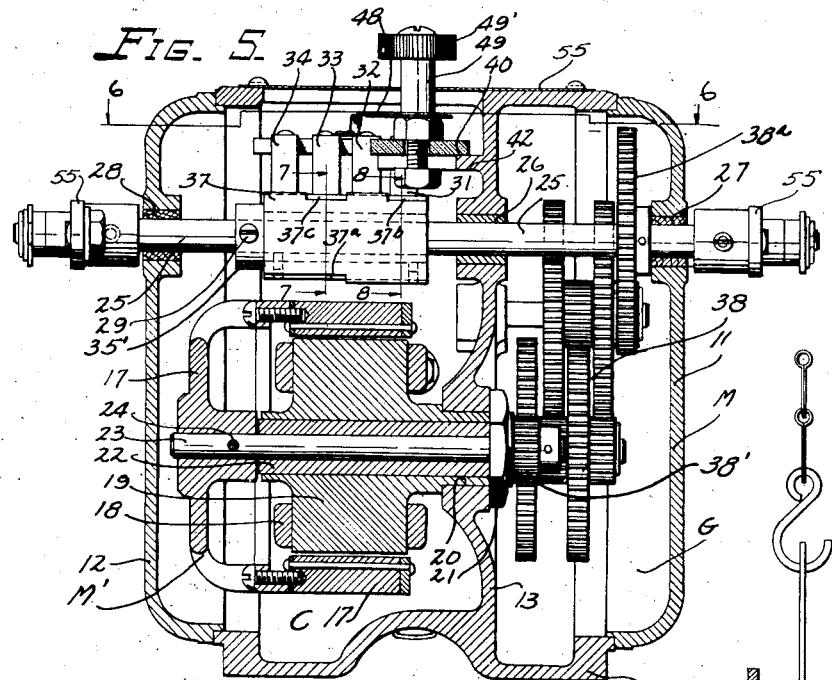
Figure 5 is a view in vertical cross-section taken on the line 5—5 of Figure 3.
Figure 6:
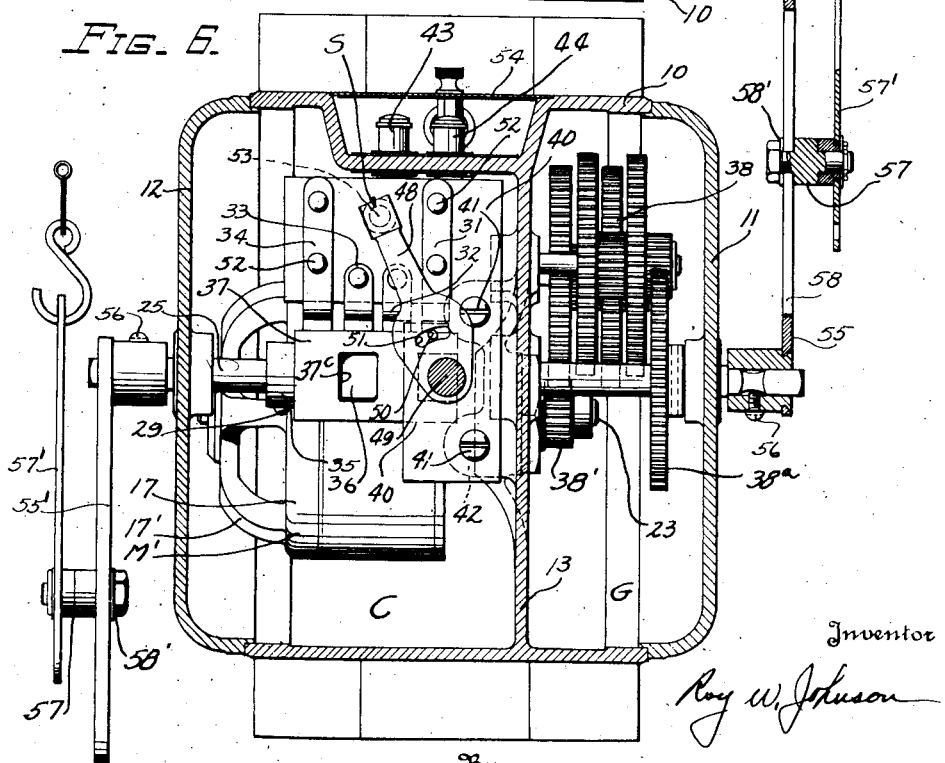

Figure 6 is a view in horizontal cross section taken on the line 6—6 of Figure 5; and Figures 7 and 8 are detail cross sectional views of the commutator on the lines 7—7 and 8—8, respectively, of Figure 5.

Figure 1:
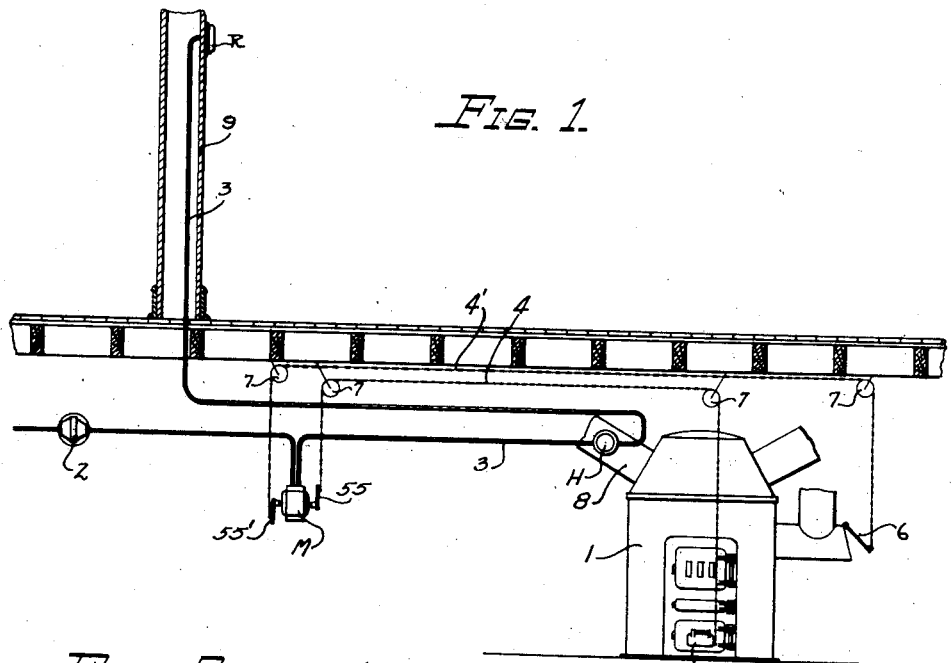
Figure 1 is a view in elevation of a hot air heating plant with a control system embodying the novel features of the present invention applied thereto, the building structure being shown in section.

Referring to Figure 1 of the drawings, a regulating system is shown in connection with a hot air furnace 1 equipped with the usual direct shaft damper 5 and check draft 6 biased to closed position under the action of gravity in a conventional manner. Chains or other flexible elements 4 and 4' are provided and have ends attached to the dampers 5 and 6, the intermediate portions of the chains 4 and 4' being deflected and guided around pulleys 7 and the other ends thereof being connected to links 57' swiveled on crank pins 57 adjustably secured to and projecting outwardly from oppositely extending crank arms 55 and 55' fixed as at 56 to the ends of an operating shaft 25 that project beyond the casing of the operating unit M. The adjustable connection between each crank pin 57 and its crank arm is had by providing longitudinal slots 58 in the crank arms and clamping the crank pin 57 in any position along these slots by means of clamping nuts and washers 58' coacting with reduced and threaded extensions of the crank pins.

The operating unit on which the operating shaft 25 is rotatably supported comprises, as shown in Figures 3 to 6, inclusive, a casing 10 having end openings normally closed by removable cover plates 11 and 12. Internally, the casing is provided with a vertical partition 13 which divides the interior of the casing into a gear chamber designated generally at G and a compartment designated at C. The operating shaft 25 is driven or rotated from an electric motor, designated generally at M' and which may be of any suitable or conventional construction. Preferably, however, the motor is adapted to be operated at low voltage and, as shown, may be a single phase induction motor having a rotor 17 surrounding and revolvable about stationary field coils 18. The field coils 18 are mounted on a coil support 19 having one end reduced and shouldered and clamped by means of a nut 21 in an opening 20 formed in the partition 13. In an axial opening formed in the coil support 19, a bearing sleeve or bushing 22 is fitted and held. A motor shaft 23 is rotatably fitted in the bearing bushing 22 and has one end secured to the spider 17' of the rotor 17 by a pin 24. The opposite end of the motor shaft 23 projects into the gear box G and has the driving pinion 38' of a reduction gear train 38 fixed thereto. The gear train 38 has all of its pinions (except the driving pinion 38' which is fixed to the motor shaft 23 and the driven gear 38$^a$ which is fixed to the operating shaft 25) rotatably mounted on fixed shafts supported by the partition 13. As the entire gear train is housed in the enclosed gear box G and as this gear box is filled with grease, the gears operate in the lubricant and are noiseless in operation and there is no necessity of oiling the gears or giving them any attention whatsoever.

In the position of the cranks 55 and 55' shown in Figure 1, the direct draft damper 5 is closed and the check draft damper 6 is open. Rotation of the operating shaft 25 and its cranks 55 and 55' through an angular distance of 180° will reverse the position of the cranks 55 and 55' and open damper 5 and close damper 6. Further rotation of the shaft 25 through 180° will bring the cranks and dampers back to the position shown in Figure 1. The present invention proposes to so control the operation of the motor M' that it always runs in the same direction and is automatically stopped whenever it has turned the shaft 25 and cranks 55 and 55' through 180°.

The automatic operation of the electric motor M' is controlled and regulated by three switches, that is, by a type of thermostatic switch commonly termed a room thermostat and designated at R (see Figure 1), by a heater thermostatic switch H which is responsive to the temperature of the heating medium at the furnace, and by a limit switch L which automatically shuts off the motor at the end of any operating phase or cycle. In other words, with the limit switch L in an appropriate position, the motor is started in operation by the combined action of the thermostatic switches R and H and after it has operated to the extent necessary to open the damper 5 and close the damper 6 or to close the damper 5 and open the damper 6 then the limit switch L functions to break the motor circuit and stop its operation.

A manually operable switch designated generally at S is also provided in the operating unit and is connected up in the system so as to be operable to cut out or provide a shunt path around the thermostatic switches H and R and permit of operating of the dampers 5 and 6 independently of the thermostatic switches, as will be hereinafter more fully described.

The room thermostat R may be of any suitable or conventional construction but preferably it embodies one of the constructions described and claimed in the copending application of Roy W. Johnson for thermostatic switches, executed under even date herewith and identified as Case G, Serial No. 356,581 filed April 19, 1929.

Similarly the heater thermostatic switch H may be of any appropriate or conventional construction but when used in a hot air furnace or on a hot water boiler it preferably embodies the construction described and claimed in the copending application of Roy W. Johnson, executed under even date herewith (identified as Case F), filed April 19, 1929, Serial No. 356,580. Reference is made to these applications for full disclosures of the thermostatic switches R and H. The switch H, when used upon a boiler of a vapor or steam heating system, is so constituted as to be responsive to pressure. Such pressure responsive switches are well known in the art and so no detail disclosure of a switch so constituted is believed to be necessary.

For the purposes of the present invention it is sufficient to understand that the room thermostat of the thermostatic switch R includes, as conventional, a pair of relatively fixed opposed contacts 114 and 115 between which a movable switch blade 120 operates, the switch blade 120 being influenced by the usual thermo-responsive element. Such room thermostats also usually include some means for varying the point at which the thermo-responsive element is effective to operate its movable blade and such adjustments are usually effected automatically by time controlled mechanism.

The thermostatic switch H includes a thermo-responsive or pressure responsive element subject to the temperature or pressure of the heating medium in or immediately adjacent to the heating plant and acting through a suitable motion transmission train to operate the movable blade 93 of a switch including the movable blade and a pair of relatively fixed opposed contacts 92 and 92'.

The limit switch L comprises a drum or cylinder designated generally at 35 and mounted upon that portion of the operating shaft 25 that is located in the compartment C. As shown in Figure 5, the shaft 25 extends through bearings 26, 27 and 28 provided therefor in the partition 13 and in the removable cover plates 11 and 12. The drum or cylinder 35 has an inner metallic sleeve 35' fastened by a set screw 29 to the shaft 25. A sleeve 36 of insulating material is tightly fitted on the metal sleeve 35' so as to be constrained to rotate therewith and a contact shell 37 of conducting material is similarly fitted on the insulating sleeve 36. The contact shell or member 37 is suitably slotted or cut away as at 37$^a$, 37$^b$ and 37$^c$ to expose the underlying portions of the insulating sleeve 36. Contact fingers 31, 32, 33 and 34 are riveted or otherwise suitably secured to an insulating plate or contact carrier 40 fastened by screws 41 to a lug or bracket 42 formed integral with the partition 13. These contact fingers coact with the drum or cylinder 35, the contact fingers 31, 33 and 34 engaging the metal shell 37 in certain phases of the operation and the exposed portions of the insulating sleeve 36 in other phases of the operation. The contact finger 31 is out of contact with the metal shell in one stopped position of the drum by virtue of the action of the slot 37$^b$ and the finger 34 is out of contact with the shell 37 in the other stopped position by virtue of the action of the slot 37$^a$. The finger 33 is disconnected from the shell 37 in both stopped positions as it lies in the path of movement of the slot 37$^c$ and also of part of the slot 37$^a$. The contact finger 32 always bears on the contact shell 37.

The thermostatic switches H and R are connected to each other and to the limit switch L in a novel manner but by the conventional so-called red, white and blue conductors, it being the universal practice to give the insulation on these several conductors the colors red, white and blue and to correspondingly designate the binding posts to which they respectively connect to facilitate proper installation.

Binding posts 44 and 46 are provided on the operating unit and are connected to the secondary of a transformer 2, the primary of which is supplied with current from the power lines. The binding post 46 is connected through conductor 32$^a$ with the motor field coils 18, and the latter are connected through conductor 32' with the contact finger 32 which engages that portion of the metal shell 37 that presents a continuous and unbroken periphery entirely around the circumference of the drum or cylinder 35.

The binding post 44 connects through conductor 48' to the movable blade 48 of the manually operable switch which is ordinarily engaged with contact 53 connected by conductor 53' with a binding post 45 of the operating unit. Binding post 45 connects by white conductor W with the movable contact blade 93 of the thermostatic switch H. Thus, the movable blade 93 of the thermostatic switch is always connected to the source of current when the manually operable switch is positioned to have the control unit operate automatically.

The blade 93 of switch H is engageable with contacts 92 and 92′ under the influence of its thermo-responsive element and this switch H is so set that when the temperature of the heating medium rises to the maximum point at which the heating medium can operate safely and efficiently in the system, the blade 93 is engaged with the contact 92′. However, as long as the temperature of the heating medium is below such maximum point the blade 93 is engaged with the contact 92.

When the blade 93 of switch H is engaged with the contact 92 it establishes a connection between the source of current and the movable contact blade 120 of the room thermostat R since the contact 92 is connected by white wire W′ with the movable contact blade 120. Obviously, when the blade 93 of the thermostatic switch H is engaged with contact 92′ the current cannot flow to the thermostatic switch R and the position or action of the switch R has no effect on the operation of the system.

The blade 120 of switch R is engaged with the contact 114 under the influence of its thermo-responsive element when the room temperature is at or above the point which the room thermostat is set to maintain and when the room temperature drops below such point the thermo-responsive element causes the contact blade 120 to engage the contact 115. The contact 115 is connected by the red wires with a binding post 47 of the operating unit, and the binding post 47 is electrically connected by conductor 47′ with the contact 52 of the manually operable switch and also to the contact finger 31 of the limit switch. The contact 114 of the room thermostat R and the contact 92′ of the thermostatic switch H are both connected to the blue wires which connect with a binding post 43 of the operating unit. The binding post 43 connects by a wire 52′ with the contact 52 of the manually operable switch and with the contact finger 34 of the limit switch.

Figure 2:
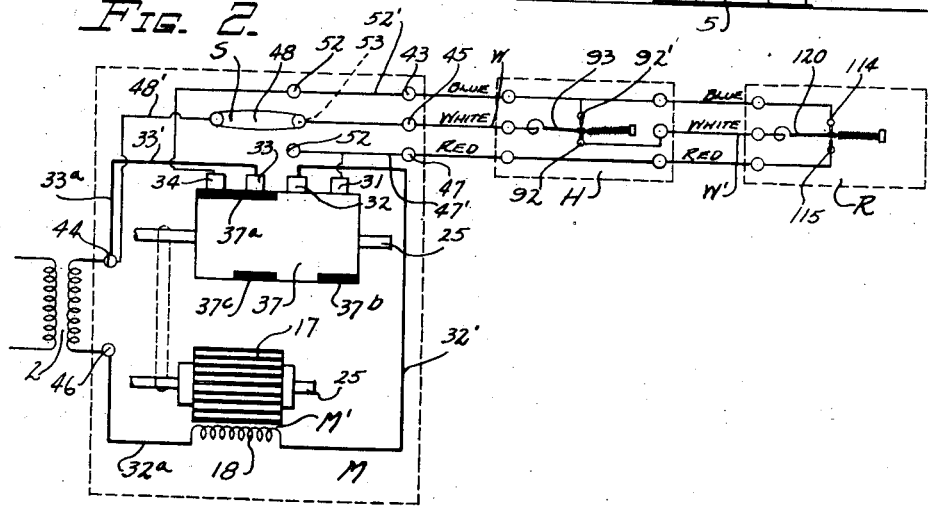
Figure 2 is a diagram illustrating the electrical connections and operation of the control system of Figure 1.

The limit switch L is synchronized in its operation with the action of the operating mechanism for the dampers 5 and 6 and this is conveniently effected by properly positioning and fixing the drum 35 of the limit switch on the operating shaft 25. The contact shell in all positions affords a conductive path between either the contact finger 31 or the contact finger 34 and the contact finger 32. When the operating shaft 25 has reached the end of a movement effective to close the direct damper 5 and open the check damper 6 (this being the position shown in Figure 2), the conductive path between finger 34 and finger 32 is broken as the cut-out portion or slot 37ᵃ of the contact shell 37, then comes beneath the contact finger 34. At this time the contact shell 37 affords a conductive path between the contact finger 31 and the contact finger 32 but this does not complete the motor circuit because the contact finger 31 connects only with the fixed contact 115 of the room thermostat R and under the conditions obtaining at this time the movable contact blade 120 of the room thermostat engages the contact 114. Should the temperature of the room drop below the point which the room thermostat R is set to maintain, the blade 120 is engaged with the contact 115 and then the current flows from the binding post 44, through the wire 48′, switch blade 48, contact 53, binding post 45, white wire W, blade 93 and contact 92, of switch H, white wire W′, and blade 120, to the contact 115 of switch R, and thence back through the red wires to the binding post 47 and through the conductors 47′ to the contact finger 31. As the shell 37 in this phase of the operation electrically connects the contact finger 31 with the contact finger 32 the current flows from finger 31 to finger 32 through the portion of the shell 37 intervening between them and thence through the wire 32′ to the field coils 18 of the motor and from the field coils 18 through the conductor 32ᵃ to the binding post 46. This starts the motor M′ and as soon as the motor starts the shaft 25 begins to turn. While the motor 17 revolves at high speed the shaft 25 turns very slowly due to the action of the reduction gearing between the motor shaft and the shaft 25. The operation of the motor continues until the shaft 25 and drum 35 have turned through an angular distance of 180°, this being the movement required to open the direct damper 5 and close the check damper 6. At the completion of such 180° movement the cut-out or slotted portion 37ᵇ of the shell 37 comes beneath the finger 31 and breaks the motor circuit to stop the operation of the motor. Any overrunning of the motor is unimportant as it does not impart any appreciable motion to the shaft 25, the reduction effected by the gearing being of such high ratio. When the slot 37ᵇ is beneath the finger 31, the slot 37ᵃ is 180° from the contact finger 34 so that the contact finger 34 then rests on the shell 37 and is electrically connected with the finger 32. But in such position of the parts the motor circuit is not completed because the contact finger 34 is connected with one side of the source of current only when the contact blades 93 or 120 of the switches H and R are engaged with the contacts 92′ or 114, respectively, and at this time the blades 93 and 120 engage contacts 92 and 115, respectively. Thus, as long as the temperature of the room remains below the point which the room thermostat is set to maintain and as long as the temperature of a heating medium does not reach the maximum point at which it can operate safely and efficiently in the system, the damper 5 will remain open and the damper 6 closed and combustion in the heating plant will be accelerated. If the temperature of the room rises to the point which the room thermostat R is set to maintain, then the contact blade 120 engages the contact 114 and the finger 34 is connected with the source of current and the motor circuit is completed through contact 114, the blue wires, binding post 43, contact 52, contact finger 34, shell 37, and contact finger 32 and thence through the field coils as before.

The finger 34 will be connected to the source of current if the temperature of the heating medium rises above the point at which it can operate safely and efficiently in the system, as, under such circumstances, the blade 93 which is always connected with the source of current when the control unit is set for automatic operation, engages the contact 92' which has an unbroken electrical connection with the finger 34. In either event, the motor is started up and continues to run until the shaft 25 is turned 180° and consequently the cranks 55 and 55' moved to close the damper 5 and open the damper 6. At the completion of such movement the slot 37ª comes beneath the finger 34 and breaks the motor circuit.

Whenever the motor circuit is completed it is at first completed through the thermostatic switches and either the contact fingers 31 or 34, in the manner described, but after the shaft 25 is moved a slight distance the motor circuit is then maintained independently of the thermostatic switches until a 180° movement of the shaft 25 has been completed. This is effected by providing the contact finger 33 and connecting it to the binding post 44 by a conductor 33'. The slot or cut-out portion 37ª of the contact shell is long enough to expose the insulating sleeve of the shell to the contact 33 as well as to the contact 34 in one position of the drum cylinder 35. However, this slot 37ª has only a slight angular extent and this is also true of the slots 37ᵇ and 37ᶜ. The slot 37ᶜ also coacts with finger 33 in that it causes this finger 33 to rest on the insulating shell in the other position in which the motor is stopped. However, after the shaft 25 and drum 35 have moved a slight distance from either stop position the finger 33 engages the shell 37 and the motor circuit is then completed from binding post 44, through conductor 33ª, contact finger 33, shell 37, contact finger 32, conductor 32', field coils 18, and conductor 32ª, to binding post 46. This has the advantage of insuring the completion of any operating phase or cycle, even though the thermostatic switches should chatter or their position be otherwise disturbed due to influence of vibration or for any other cause.

If the furnace is shut down, that is, if the damper 5 is closed and the check 6 is opened and it is desired to accelerate combustion independently of the action of the thermostatic switches, this may be done by engaging the movable blade 48 of the manually operable switch with the contact 52. This provides a connection between the finger 31 (which bears on the metal of the contact shell 37 at such times) and the binding post 44 independently of the thermostatic switches and consequently completes the motor circuit, and causes the operating unit to act to open the damper 5 and close the check 6. If the damper 5 is open and check 6 closed and it is desired to retard combustion by closing the damper 5 and opening the damper 6 and to do this independently of the action of the thermostatc switches it is simply necessary to engage the movable contact blade 48 with the contact 52, and this will complete the motor circuit because through the manually operable switch the contact finger 34 which then bears on the metal of the contact sheet 37 is connected to the source of current independently of the thermostatic switches.

The blade 48 of the manually operable switch is fixed to a shaft 49 pivotally supported on the insulating plate 40 (see Figures 3, 5 and 6). The shaft extends up through and above the top of the casing and through a removable plate 55 which affords access to the switches within the operating unit. At the upper end of the shaft 49 a knob 49' is provided to facilitate turning of the shaft and consequently of the movable contact blade 48. A stop pin 50 is also secured to the plate 40 and extends through an arcuate slot 51 provided in the blade 48. At one limit of its movement the blade 48 engages the contact 52 and at the other limit of its movement the blade 48 engages the contact 52'. These contacts 52 and 52' are preferably in the form of buttons or round headed rivets directly secured to the contact fingers 34 and 31, respectively. Of course, the contact 53 is a separate button riveted or fastened to the insulating plate 40 and is disposed midway between contacts 52 and 52'.

The binding posts 43, 44, 45, 46 and 47 are conveniently mounted on a depressed wall 10ª of the casing which provides a recess or chamber to which the wires from the transformer and thermostatic switches lead. The chamber 34 is closed by a removable plate 54.

As will be understood from the foregoing, the motor is connected to one side of the source of current and its connection with the other side of the current source is controlled by three switches R, H and L, that is, by the room thermostat, the heater switch, and the limit switch. Of course, this is true only when the system is set for automatic operation by engaging the movable blade 48 of the manually operable switch S with its contact 53. Now, each of these switches R, H and L has a high temperature contact, a low temperature contact, and a movable contact, contacts 114, 92' and 34 being the high temperature contacts, contacts 115, 92 and 31 the low temperature contacts, and blades 120 and 93 and shell 37 the movable contacts. The movable contact 37 of the limit switch is synchronized in its operation with the motor so that this movable contact 37 is engaged with its low temperature contact 32 when the motor has operated to close the draft controlling means, that is, to close the damper 5 and open the check 6. On the other hand, when the motor has opened the draft controlling means, that is, opened the damper 5 and closed the check 6, then the movable contact 37 of the limit switch is engaged with its high temperature contact. In other words, at the completion of any operating cycle the limit switch not only stops the motor but also is positioned for the next operating cycle. All of the high temperature contacts are directly connected together. The movable contact of the heater switch H is connected to the source of the current but the movable contact 120 of the room thermostatic switch R is connected to the low temperature contact 92 of the heater switch so that flow of current to the thermostatic switch depends upon the engagement of the movable contact blade 93 of the heater switch H with its low temperature contact 92. The low temperature contact 115 of the thermostatic switch R connected with the low temperature contact 31 of the limit switch L. Consequently the motor circuit will be completed during the draft opening cycle only upon the occurrence of low temperatures at both the heater switch and the thermostatic switch. However, the motor circuit may be completed for a draft closing cycle upon the occurrence of high temperatures either at the limit switch H or at the thermostatic switch R.

With a system of this character, the thermostatic switch H prevents the combustion from being accelerated and shuts down the boiler or furnace after the temperature of the heating medium has risen to a point at which it can operate with safety and efficiency in the system and does this irrespective of the action of the room thermostat R. In other words, even if the room thermostat R is calling for heating, the furnace or boiler will nevertheless be shut down by the action of the thermostatic switch H as soon as the temperature of the heating medium reaches the point at which it can operate safely and efficiently in the system. Of course, as long as the temperature of the heating medium is below this maximum point the action of the boiler or furnace is regulated under the control of the room thermostat.

The operating unit presents a very compact construction and one of its important advantages is that it permits of the employment of a low voltage motor. Thus, the motor may operate at only 20 volts and yet the operating unit has the same power as similar types of motors operating on 110 volts. The cost of installation is materially reduced by reason of the use of this low voltage motor since all conduit beyond the transformer is eliminated.

What I claim is:

1. An automatic regulating system for use with the draft controlling means of the heater and comprising an operating unit including a casing having an internal partition providing a gear chamber and a compartment, an electric motor mounted on the partition and located in the compartment, said motor having its motor shaft projecting into the gear chamber, an operating shaft extending through the compartment and through the gear chamber and projecting exteriorly of the casing and having such exterior portions connected to the draft controlling means, reduction gearing housed in said gear chamber and establishing a driving connection between the motor shaft and the operating shaft, a drum type limit switch located entirely in the compartment and having a contact shell mounted on and rotatable with the operating shaft and contact fingers supported on the casing and coacting with the contact shell, a circuit for the motor including a source of current to one side of which the motor is constantly connected, a branching connection between the other side of the source of current and the motor, two thermostatic switches for making or breaking one or the other of the branching connections depending upon the heat conditions to which the switches are individually responsive, said limit switch being incorporated in said branching connections and being operable to complete one branching connection and interrupt the other at the end of each operating cycle.

2. An automatic regulating system for use with the draft controlling means of a heater and comprising an electric motor connected to said draft controlling means for operating the same, a circuit for said motor including a source of current, a connection between the motor and one side of the source of current, and means regulating the connection of the motor with the other side of the source of current and including a drum type limit switch, a heater theremostat and a room theremostat, the high temperature contacts of the thermostats being connected in series with each other and with one contact finger of the limit switch, the movable blade of the heater thermostat being directly connected with the source of current, the movable blade of the room thermostat being connected with the low temperature contact of the heater thermostat, the lower temperature contact of the room thermostat being connected with another contact finger of the limit switch, the limit switch being operable to stop the motor at the end of any operating cycle with its elements so positioned as to be ready for the next operating cycle.

In witness whereof, I hereto affix my signature.

ROY W. JOHNSON.